Jan. 27, 1953
G. A. JUST
2,626,682
CHECK OUT COUNTER
Filed June 23, 1950
3 Sheets-Sheet 1
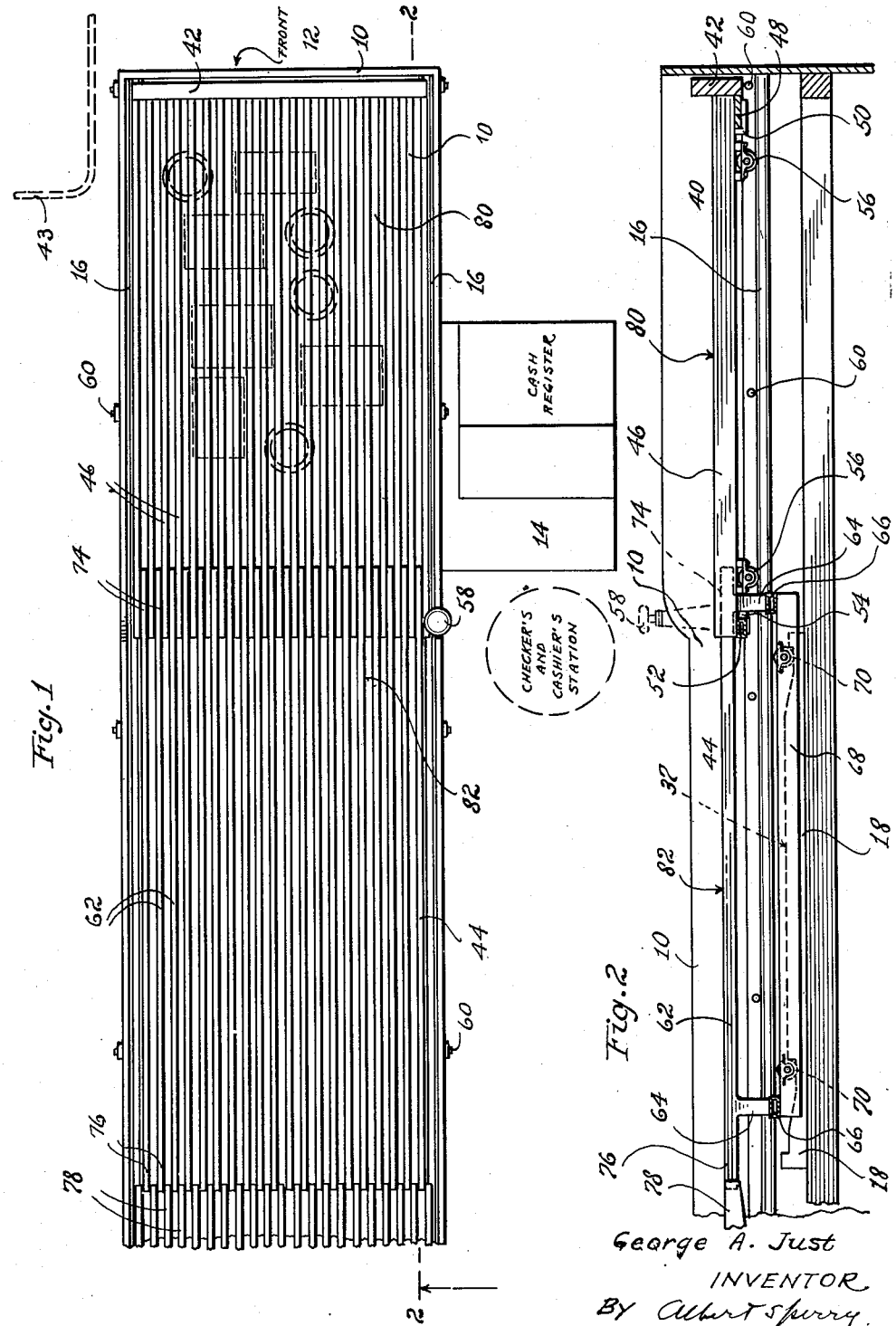
George A. Just
INVENTOR
BY Albert Sperry
ATTORNEY

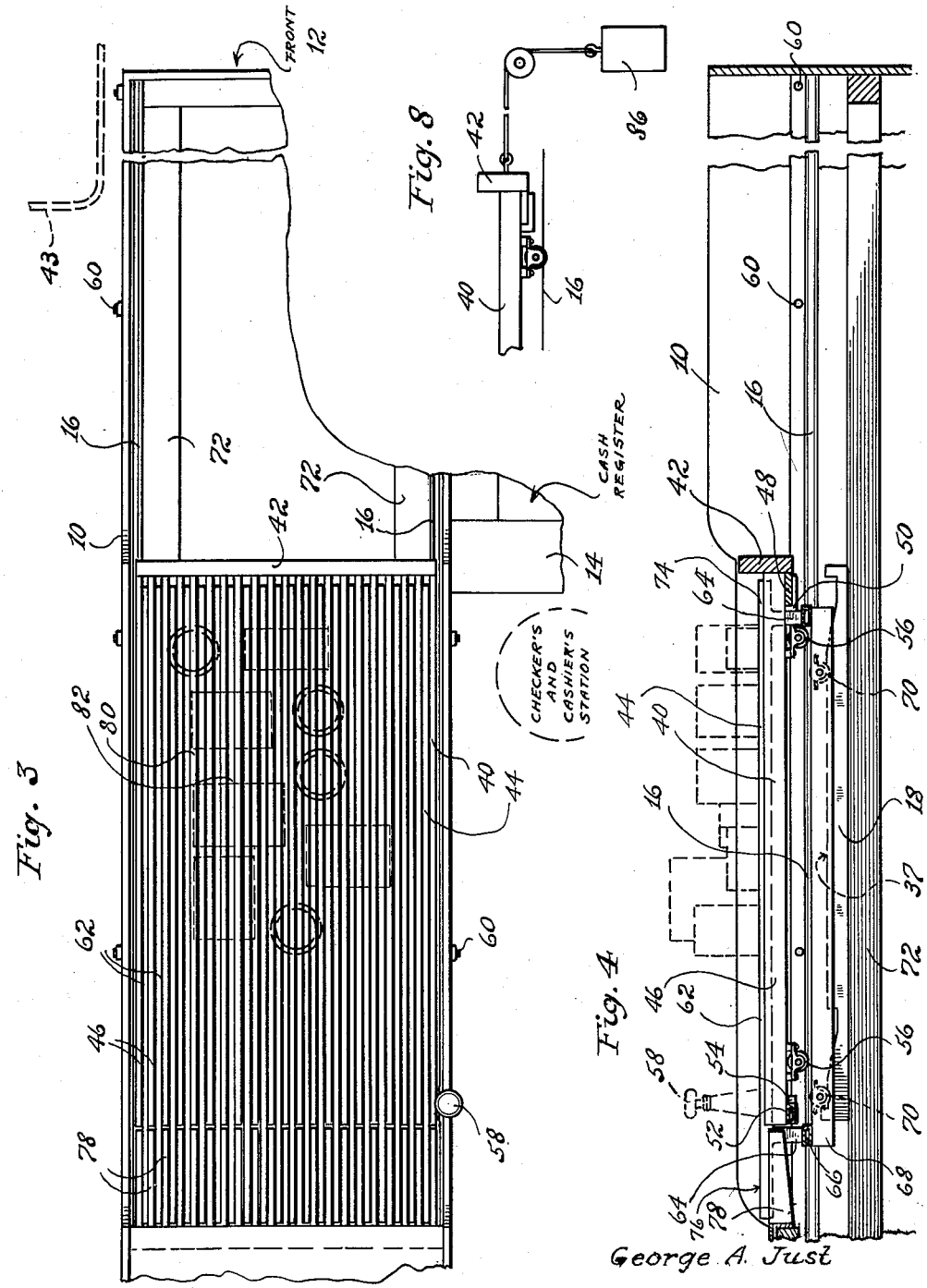

Jan. 27, 1953 G. A. JUST 2,626,682
CHECK OUT COUNTER
Filed June 23, 1950 3 Sheets-Sheet 3
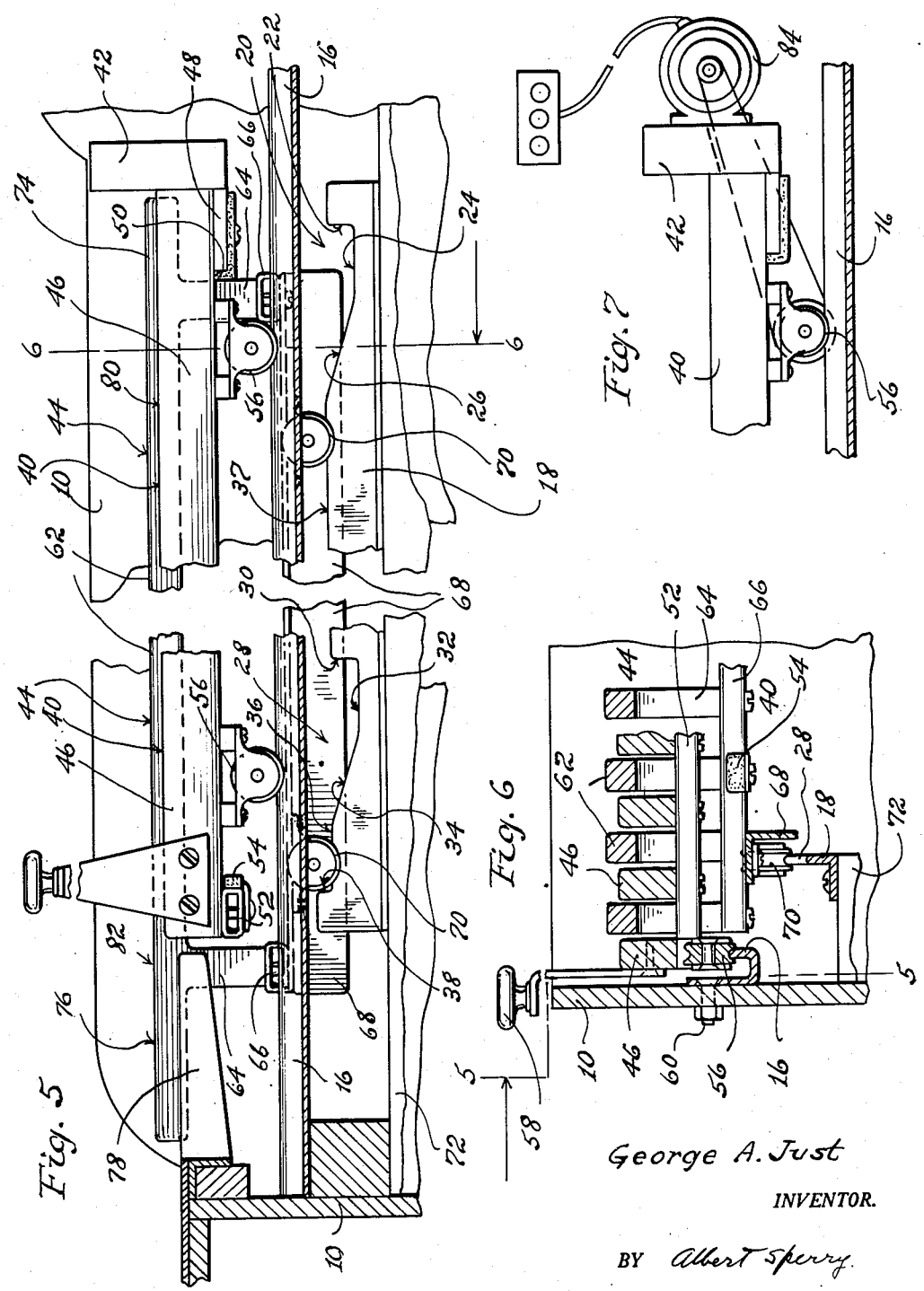
George A. Just
INVENTOR.
BY Albert Sperry
ATTORNEY Patented Jan. 27, 1953

2,626,682

UNITED STATES PATENT OFFICE 2,626,682

CHECK OUT COUNTER

George A. Just, Scarsdale, N. Y., assignor to The Grand Union Company, New York, N. Y., a corporation of Delaware Application June 23, 1950, Serial No. 169,823

16 Claims. (Cl. 186—1)

This invention relates to apparatus and equipment for handling articles of merchandise in retail stores, and particularly in stores of the self-service type in which the customers select the articles desired for purchase and carry them to a check-out counter to be checked, paid for and packed in bags or other containers.

More specifically, the present invention relates to a check-out counter construction and article handling equipment associated therewith.

It is generally recognized that the volume of sales in self-service stores is seriously limited because of the amount of time required to check and pack the purchased goods at the counter. Therefore, one of the primary objects of this invention is to provide a check-out counter having associated therewith simple and effective means for expediting the checking and packing of articles of merchandise brought to the counter by the customers of the store.

A further important object of the invention is to provide means for reducing the labor in checking and packing the merchandise.

One of the principal advantages of the present invention over previous counter equipment resides in the provision of a pair of cooperative and relatively extensible tables arranged for longitudinal travel on the counter frame, one table functioning as a carrier table for moving articles from the front end of the counter to the checker's station, and the other table functioning to lift the articles from the carrier table and support them in a stationary position until removed by the checker while the carrier table is returned to the front end of the counter to receive articles from the next customer.

A further important object of my invention is to provide a carrier table and a lifter table for a check-out counter by means of which various articles of merchandise can be moved from the carrier table to the lifter table in the same arrangement or grouping of the different kinds of merchandise. For example, groceries, meats, produce and other articles selected by a customer may be placed in separate groupings on the carrier table and transferred to the lifter table without disturbing the relative positions of the articles. Signs naming the groups of articles may be painted on the bars of the carrier table as a guide for the person who unloads the articles. One purpose of this arrangement is to enable the cashier to keep a separate record on the cash register or registers of the sales of each department of the store, namely those selling groceries, meats, produce and other kinds of merchandise.

Another purpose is to keep items of a perishable nature, such as eggs, butter and meats separate as an aid or convenience to the packer and the customer.

Further objects and advantages of the invention will be apparent from the following specification taken in connection with the accompanying drawings showing certain forms of the invention in which—

Fig. 1 is a plan view of a typical check-out counter embodying the present invention showing the extensible tables in extended positions;

Fig. 2 is a sectional view of the construction shown in Fig. 1 taken on the line 2—2, and looking in the direction of the arrows;

Fig. 3 is a plan view similar to Fig. 1 but with the extensible tables in their retracted position;

Fig. 4 is a longitudinal sectional view through Fig. 3;

Fig. 5 is an enlarged, longitudinal sectional view showing details of the extensible tables illustrated in Figs. 1 to 4, taken on the line 5—5 of Fig. 6, and showing the carrier and lifter tables in their retracted positions;

Fig. 6 is a transverse sectional view taken on the line 6—6 of Fig. 5;

Fig. 7 is a side view of one end of the carrier table showing the attachment of an electric motor thereto for moving it in either direction; and Fig. 8 is also a side view of one end of the carrier table showing the attachment of a weighted cable thereto to move it to its forward or loading position.

Referring to the drawings, in which like numerals designate like parts in each of the several views, 10 is a counter open at its top and having a front end 12 where articles of merchandise selected by customers of the store are carried to be checked and payment obtained by a checker and cashier stationed at the table 14 located alongside and approximately midway between the ends of the counter.

Tracks 16 and 18 are mounted longitudinally on each of the inner side walls of the counter, one above and offset from the other in parallel relation as more clearly shown in Figs. 5 and 6. The upper tracks 16 extend approximately the entire length of the counter and are straight from end to end. The tracks 18 are shorter and extend from about the middle of the tracks 16 to their rear end. Each track 18 has therein a depressed portion 20 at its front end terminating in a shoulder 22 at its outer end and including a short level track surface 24 extending rearwardly and joined by a relatively longer, upwardly inclined surface 26 to the level surface of track 18. Another depressed portion 28 is formed in the rear end of each track 18 forming a shoulder 30 at its front end and including a short level track surface 32 joined by a relatively longer, upwardly inclined surface 34 with a short level surface 36 terminating in another shoulder 38 at its rear end. The lower level surfaces 24 and 32 are in alignment with each other and the higher level surface 36 is in alignment with the level track surface 37 of track 18.

A carrier table 40 is mounted on the straight tracks 16 and is movable along said tracks from an extended loading position adjacent the front end of counter 10 as shown in Figs. 1 and 2 to a retracted or checking position adjacent the checker's station as shown in Figs. 3 and 4. The carrier table is normally located in its loading position but after articles selected by a customer are placed on table 40, the checker may move the table rearwardly along the tracks 16 to the checking position adjacent the checker's station. A lifter table 44 is mounted for limited travel on the tracks 18 and functions to lift the articles from table 40 and support them in an elevated position while the carrier table is returned to its extended position for receiving articles from another customer while the first group of articles is being checked. When the carrier table is returned to its extended or loading position, the lifter table is returned to its lower position and the articles thereon may be removed by checkers or packers who place them in bags or other containers to be carried from the store.

The tables 40 and 44 are assembled together in parallel, extensible relation and for this purpose they preferably are provided with supporting surfaces which are interfitted in a manner to permit such relative longitudinal and vertical movement of the tables. As shown, carrier table 40 is constructed of a plurality of spaced support members, preferably in the form of elongated bars 46, disposed in parallel, horizontal relation and an end rail 42 extends upward across the front end of the table to hold articles thereon as it is moved from one position to another. The bars 46 are secured together at their front ends by a transversely extending plate 48, bolted to each bar and having a shock absorbing bumper 50 which is secured to the rear edge thereof. The rear ends of bars 46 are secured together by transverse tubular tie rail 52, which has a shock absorbing bumper 54 on its front edge. Grooved rollers 56 adapted for travel on tracks 16 are mounted on the lower edges of the outer bars 46 and a handle 58 for manually moving table 40 is secured to one of the bars 46 at its rear end. Tracks 16 are firmly secured to the inner walls of counter 10 by suitable means, such, for example, as the bolts 60.

The lifter table 44 is constructed of a plurality of spaced bars 62 which are slidably interfitted with the bars 46 of carrier table 40. The bars 62 are provided at each end with depending legs 64 which are bolted to tubular tie rails 66. The tie rails 66 are bolted at their ends to angle bars 68 on which grooved rollers 70 are mounted in position to engage tracks 18 supported on the inner walls of the counter by girders 72. The front ends 74 of the bars 62 project slightly beyond front legs 64 in order that the ends of the bars 62 shall at all times be in mesh with the ends of the bars 46, whereas the rear ends 76 of the bars 62 project a substantial distance rearwardly of the rear legs 64 so that they will at all times be in mesh with a plurality of spaced bars 78 forming a rear end plate for counter 10. The upper surfaces of bars 78 are in the same plane as the upper surfaces of bars 62 of table 44 when in their lowered position. The front ends 74 of bars 62 interfit with the bars 46 of carrier table 40 at all times and the rear ends of bars 62 interfit with bars 78 so that there will be no gap between the ends of such bars when the tables are in either retracted or extended positions. The bars 46 and 62 form two separate, slotted article supporting surfaces 80 and 82, respectively, the surface 80 of carrier table 40 being higher than the surface 82 of lifter table 44 when the tables are in extended position and lower than surface 82 when the tables are in retracted position.

With this construction it will be seen that when carrier table 40 is moved forward and approaches its loading position adjacent the front end 12 of counter 10, bumper 54 on the carrier table will engage the front legs 64 on the lifter table 44 and move the lifter table a short distance forward along its tracks 18 until rollers 70 abut the end 22 of the track. Similarly, when carrier table 40 is moved rearwardly and approaches the checking position, bumper 50 on the carrier table will engage the front legs of the lifter table to move it rearwardly along tracks 18.

In operation, the carrier table 40 is moved to its extended position to the front end of counter 10, as shown in Figs. 1 and 2, either manually by means of handle 58 or my motor driven means, or by any other convenient means. Irrespective of the means for moving carrier table 40, it will, near the end of its forward travel, abut lifter table 44 through bumpers 54 and move the lifter table to its forward position, as shown in Fig. 2. The rollers 70, when moved forwardly in depressed portions 20 and 28 of tracks 18, will roll down inclined track surfaces 26 and 34 to the lower level track surfaces 24 and 32 against stop shoulders 22 and 30, thereby not only lowering article supporting surface 82 below the plane of surface 80 but also stopping the forward travel of both tables. Obviously, table 40 can also be stopped at any point desired. Conversely, when carrier table 40 is moved to its rearward, retracted position it will abut lifter table 44 through bumpers 50 and roll it to the higher level track surfaces 36 and 37 and against shoulder 38, thereby raising surface 82 above the plane of surface 80, and also stopping the travel of both tables when in completely retracted position, as shown in Figs. 4 and 5. As the supporting bars of tables 40 and 44 are interfitting, as shown, the raising of table 44 effects the lifting of all articles from the surface 80 of carrier table 40 to the surface 82 of lifter table 44 in the same relative positions which they occupied on the carrier table.

In Fig. 7 the carrier table 40 is shown with an attached motor 84 connected to one of the rollers for propelling the table, if desired.

In Fig. 8 the carrier table 40 is shown with a weight 86 connected thereto for moving both tables to their extended positions, if desired.

With the check-out counter construction illustrated and described, continuous cycles of transferring articles on the carrier table 40 to the lifter table 44 may be conducted by the checker by actuating the tables either manually or by application of motor power, thereby automatically operating the lifter table and greatly expediting and lessening the labor of checking out merchandise to customers of the store.

Various detail changes may be made within the scope of my invention, and it is to be understood that the specific constructions shown and described are illustrative only and not restrictive thereto.

I claim:

1. A check-out counter comprising, in combination, a stationary counter frame, a pair of cooperative and relatively extensible tables mounted for longitudinal travel on said frame, each of said tables having a plurality of spaced support members arranged in parallel relation with and slidably interfitting with the corresponding members of the other table, means on said tables for moving them to extended and retracted positions, and means carried by said frame cooperative with one of the tables for automatically lowering the article supporting surface of the said table when in extended position and for automatically raising said surface when in retracted position.

2. A check-out counter comprising, in combination, a stationary counter frame, a pair of cooperative and relatively extensible tables mounted for longitudinal travel on said frame, each of said tables having a plurality of spaced support members arranged in parallel relation with and slidably interfitting with the corresponding members of the other table, means on said tables for moving them to extended and retracted positions, and means carried by said frame cooperative with one of the tables for limiting the travel of the said table in each direction and for automatically lowering the said table before reaching its limit of extension and for automatically raising the said table before reaching its limit of retraction.

3. A check-out counter comprising, in combination, a stationary counter frame, a pair of cooperative and relatively extensible tables mounted for longitudinal travel on said frame, each of said tables having a plurality of spaced support members arranged in parallel relation with and slidably interfitting with the corresponding members of the other table, one of said tables being designed to function as an article carrier table and the other as a lifter table for lifting articles from said carrier table, means on said carrier table for moving said table to extended and retracted positions, means also on said carrier table cooperative with means on said lifter table for moving said lifter table in the same direction; and means carried by said frame cooperative with said lifter table for limiting the travel of said lifter table in each direction, also for automatically lowering said lifter table before reaching its limit of travel in one direction and for automatically raising said lifter table before reaching its limit of travel in the opposite direction.

4. A check-out counter comprising, in combination, a stationary counter frame, an article carrier table and a lifter table mounted for longitudinal travel on said frame, said tables being cooperative and relatively extensible, each of said tables having a plurality of spaced support members arranged in parallel relation with and slidably interfitting with the corresponding members of the other table, means on said carrier table for moving said table longitudinally in either direction, means also on said carrier table cooperative with means on said lifter table for moving the lifter table together with said carrier table in either direction, and means carried by said frame cooperative with said lifter table for limiting the travel of said lifter table in either direction, also for automatically lowering said lifter table before reaching its limit of forward travel, and for automatically raising said lifter table before reaching its limit of rearward travel.

5. A check-out counter comprising, in combination, a stationary counter frame, tracks mounted longitudinally of said frame below the upper surface thereof, a pair of cooperative and relatively extensible tables mounted for longitudinal travel on said tracks, said tables having spaced, slidably interfitting support members forming article supporting surfaces, one of said tables being designed to function as an article carrier table and the other as a lifter table for lifting articles from said carrier table, and means within one of said tracks cooperative with said lifter table for automatically lowering and stopping said lifter table during its travel in one direction, also for automatically raising and stopping said lifter table during its travel in the opposite direction.

6. A check-out counter comprising, in combination, a stationary counter frame, tracks mounted longitudinally on said frame below the upper surface thereof, one of said tracks being straight from end to end and of relatively extended length and the other being of shorter length and having depressed portions therein, a table mounted for longitudinal travel on each of said tracks, said tables being cooperative and relatively extensible and having spaced, support members forming article supporting surfaces, one of said tables being designed to function as an article carrier table and the other as a lifter table for lifting articles from said carrier table, said depressed portions being cooperative with the lifter table mounted on said tracks to effect automatic lowering of said lifter table during its travel in one direction and to effect automatic raising of said table during its travel in the opposite direction.

7. A check-out counter comprising, in combination, a stationary counter frame, tracks mounted longitudinally of said frame below the upper surface thereof, one of said tracks being straight from end to end and the other having therein depressed portions adjacent each end, a table having supporting rollers mounted for longitudinal travel on each of said tracks, said depressed portions being cooperative with one of said tables to effect the lowering and stopping of said table after a relatively short distance of travel in one direction and to effect the raising and stopping of said table after a like short distance of travel in the opposite direction.

8. A check-out counter comprising, in combination, a stationary counter frame having a pair of longitudinally disposed tracks on said frame, one of said tracks being straight from end to end and of relatively extended length and the other being of shorter length and having therein depressed portions terminating in a stop shoulder at each end thereof, a pair of relatively extensible tables having supporting rollers, one being an article carrier table mounted for free travel on said straight tracks to and from the front end of said frame and the other being a lifter table mounted on said other tracks for limited travel into and out of said depressed portions of said tracks to effect alternate lowering and raising of said lifter table, each of said tables having support members arranged in parallel relation with and slidably interfitting with the corresponding members of the other table, said carrier table having means at each end thereof alternately engageable with means of said lifter table during the travel of said carrier table to and from the front end of said frame to move the rollers of said lifter table into and out of said depressed portions against a stop shoulder to effect alternate lowering and stopping, and raising and stopping of said lifter table against further travel toward its respective extended and retracted positions.

9. A check-out counter according to claim 8 in which said counter frame and tables are so constructed and arranged that when said lifter table is supported by said depressed portions of its tracks the article supporting surface of said table is below the article supporting surface of said carrier table and when said lifter table is supported by the portions of its tracks outside said depressed portions the article supporting surface of said lifter table is above the article supporting surface of said carrier table whereby articles carried by the carrier table may be lifted therefrom by the lifter table without disturbing the relative position which the articles occupied on said carrier table.

10. A check-out counter comprising, in combination, a stationary counter frame, a pair of relatively extensible tables having spaced and slidably interfitting support members forming article supporting surfaces, said tables being mounted for longitudinal travel on said frame, means on one of the tables for moving said table in either direction, means on said table cooperative with means on the other table for moving both tables in the same direction, and means carried by said frame and cooperative with means on one of the tables for alternately lowering and raising said table during its travel along said frame.

11. A check-out counter according to claim 10 in which the means for moving one of the tables to its forward position consists of a cable attached to said table and a weight attached to the free end of said cable.

12. A check-out counter according to claim 1 in which the spaced support members of one of the tables are extended at its rearward end to interfit when said table is in its retracted position with oppositely projecting, correspondingly spaced members secured to said frame.

13. A check-out counter comprising a counter frame, tracks mounted longitudinally of said frame, one of said tracks being straight from end to end and the other having depressed portions terminating in a stop shoulder at each end thereof, an article carrier table mounted for free travel on said straight tracks and a lifter table mounted on said other tracks for limited travel, said tables being relatively extensible, each of said tables being formed of a plurality of spaced elongated bars, downwardly projecting elements at each end thereof providing supports for said tables on said tracks, the bars of each of said tables slidably interfitting with those of the other table, the upper surfaces of said bars of each table forming an article supporting surface, said carrier table having abutments on each end thereof, certain of the end supports of said lifter table having abutments on each side thereof cooperative with the abutments on the ends of said carrier table, means on said carrier table for moving said table to and from the front end of said counter, said lifter table being movable in either direction with said carrier table when abutted thereby, said depressed portions of the tracks which support said lifter table effecting the lowering of its article supporting surface below that of said carrier table when said carrier table is moved to the forward end of said counter and effecting the raising of the article supporting surface of said lifter table above that of said carrier table when said carrier table is moved to its retracted position at the rearward end of said counter.

14. A check-out counter according to claim 13 in which the article supporting bars of said lifter table have depending supporting legs at their ends, a transverse bar at each end of said table secured to said legs, and track engaging rollers mounted on each of said tables.

15. A check-out counter according to claim 13 in which the article supporting bars of said lifter table are extended at their rearward ends to interfit when said table is in its retracted position, with oppositely projecting bars secured to said frame, said latter bars having their article supporting surfaces in the same plane as that of the corresponding supporting bars of said lifter table, when said table is in its lowered position.

16. In a check-out counter a pair of relatively extensible tables, each table being formed of a plurality of spaced, elongated bars slidably interfitting with the corresponding bars of the other table, the upper surfaces of said bars forming an article supporting surface for each table, each of said bars having downwardly projecting end supports, tracks on said counter for each of said tables, track engaging rollers mounted on each of said tables, and means on one of said tables for moving it on its tracks, one of said tables having abutments on each end thereof, end supports on the other table having an abutment on each side thereof in alignment with and opposed to said abutments on the other table to effect movement of one of said tables in either direction when abutted by said other table.

GEORGE A. JUST.

REFERENCES CITED

The following references are of record in the file of this patent:

UNITED STATES PATENTS

| Number | Name | Date |
|---|---|---|
| Re. 20,028 | Cochran et al. | July 7, 1936 |
| 312,141 | Mayer | Feb. 10, 1885 |
| 1,883,763 | Cochran | Oct. 18, 1932 |
| 2,033,848 | Morris et al. | Mar. 10, 1936 |
| 2,237,080 | Muse | Apr. 1, 1941 |
| 2,242,408 | Turnham | May 20, 1941 |
| 2,317,438 | Bradley | Apr. 27, 1943 |